Oct. 3, 1967     J. W. WILSON     3,344,500
TOOL FOR USE IN ASSEMBLING CONDUITS AND END FITTINGS
Filed Aug. 10, 1966     4 Sheets-Sheet 1
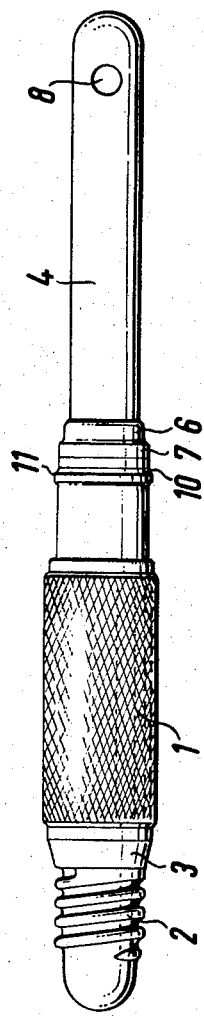
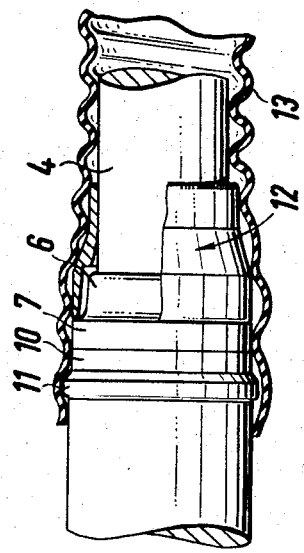
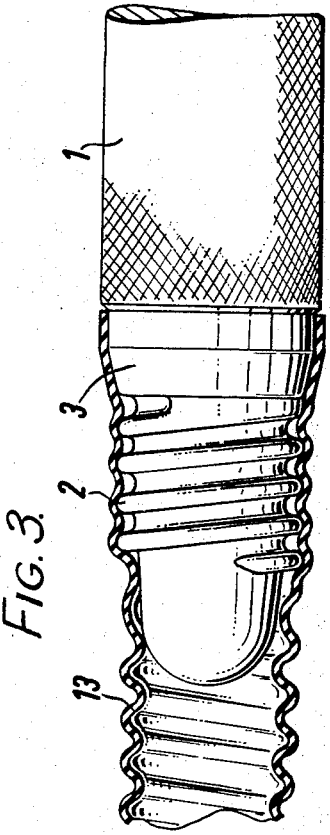
INVENTOR
JOHN WILLIAM WILSON
BY
ATTORNEY Oct. 3, 1967   J. W. WILSON   3,344,500
TOOL FOR USE IN ASSEMBLING CONDUITS AND END FITTINGS
Filed Aug. 10, 1966   4 Sheets-Sheet 2

INVENTOR
John William Wilson
BY
ATTORNEY

Oct. 3, 1967  J. W. WILSON  3,344,500
TOOL FOR USE IN ASSEMBLING CONDUITS AND END FITTINGS
Filed Aug. 10, 1966  4 Sheets-Sheet 3
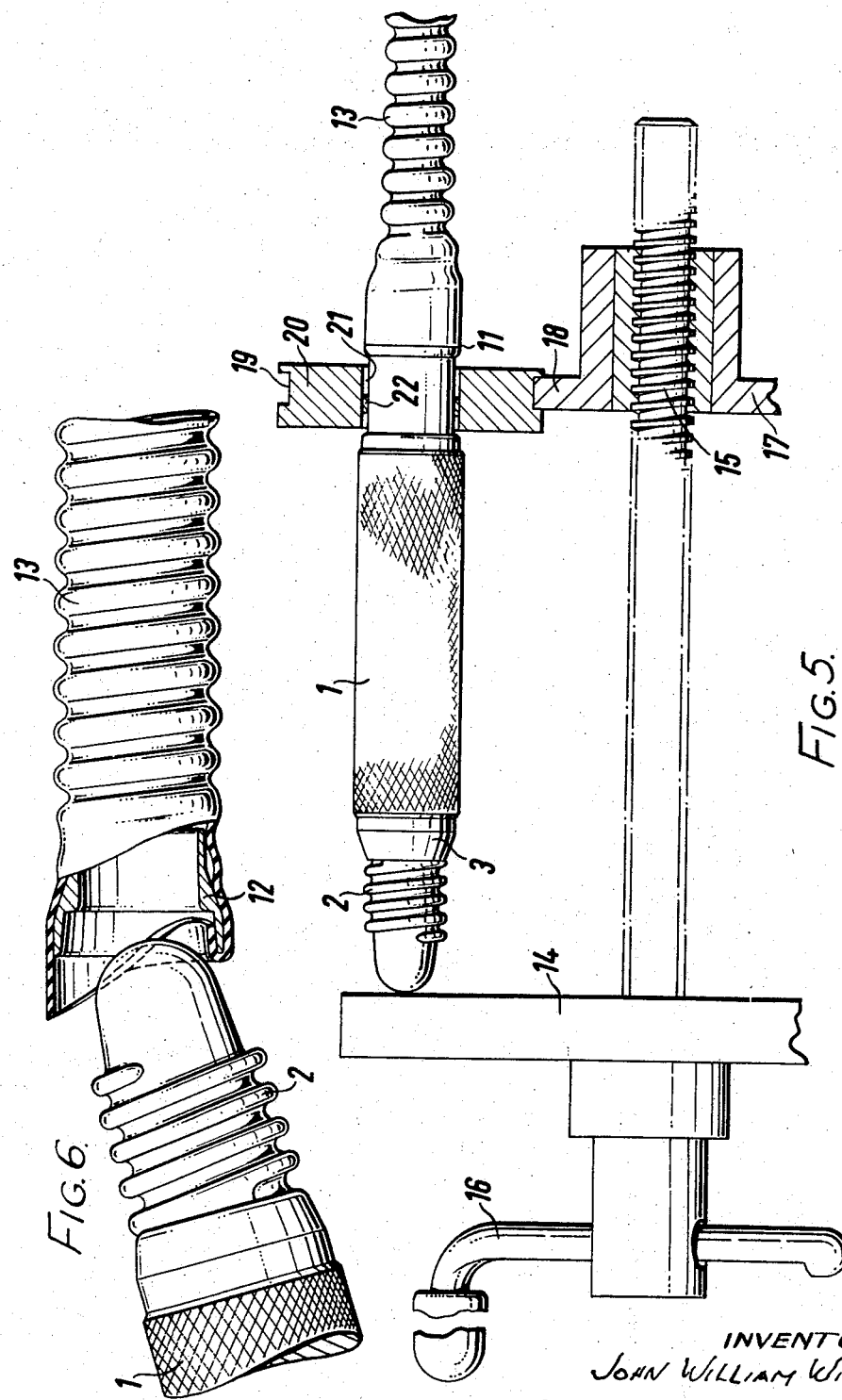
INVENTOR
JOHN WILLIAM WILSON
BY
ATTORNEY Oct. 3, 1967     J. W. WILSON     3,344,500

TOOL FOR USE IN ASSEMBLING CONDUITS AND END FITTINGS

Filed Aug. 10, 1966     4 Sheets-Sheet 4

INVENTOR
John William Wilson
BY
Arch B. Colvin
ATTORNEY

United States Patent Office 3,344,500
Patented Oct. 3, 1967

3,344,500
TOOL FOR USE IN ASSEMBLING CONDUITS
AND END FITTINGS
John William Wilson, Farnham Royal, Slough, England,
assignor to Superflexit Limited, Slough, England
Filed Aug. 10, 1966, Ser. No. 571,442
Claims priority, application Great Britain, Oct. 11, 1965,
42,984/65
4 Claims. (Cl. 29—235)

The present invention is virtually an improvement in or modification of that forming the subject of U.S. patent application No. 434,712, now Patent No. 3,286,332, the earlier application covering a tool designed to facilitate the insertion of a ring or sleeve into the end of an internally and externally helically convoluted flexible conduit, the ring or sleeve having a diameter such that it could not be inserted without expansion of the conduit at its end. The ring or sleeve is inserted into the end of the conduit a sufficient distance to permit the extremity of the conduit to be turned inwardly around the end of the ring or sleeve into the interior thereof in the manner of a cuff, the extremity of the conduit abutting against an internal shoulder in the ring or sleeve.

As the conduit is helically convoluted difficulty has hitherto been experienced in cutting off the unwanted end of the conduit with sufficient accuracy to ensure that the extremity of the conduit made good facial engagement with the internal shoulder such accurate engagement being necessary to provide an efficient seal.

The improved tool in accordance with the present invention has therefore been designed to expand the conduit at its end to receive the ring or sleeve, to insert the ring or sleeve in its correct position in the conduit, and to ensure that where the unwanted part of the conduit is to be cut off, the convolutions are completely smoothed out so that the unwanted part can be cut off accurately at right angles to the longitudinal axis of the conduit.

A tool for the purpose specified and in accordance with the present invention includes a handle portion threaded at one end to screw into the end of the convoluted conduit, the threaded part leading to a frusto-conical part for initially expanding the end of the conduit, the handle portion at its opposite end carrying a detachable cylindrical spigot shouldered to carry the ring or sleeve to be inserted in the conduit and also a detachable cutting ring having a diameter greater than that of the ring or sleeve over which the expanded end of that part of the conduit projecting beyond the ring or sleeve is forced, the ring having a cutting edge to allow the unwanted part of the conduit to be accurately severed from the remainder.

The cylindrical spigot is of a length and diameter such that it can be gripped by the hand through the conduit.

According to a further feature of the invention the unwanted end of the conduit is severed from the remainder by a shearing operation performed in a vice or its equivalent and with the help of an annular bush which is placed in position upon the conduit and by means of the vice is drawn over that part of the conduit surrounding the ring or sleeve smoothing out the convolutions in the process and finally over that part of the conduit containing the cutting ring, the unwanted part of the conduit being sheared off accurately along the line of the cutting edge on the cutting ring, leaving the conduit and its inserted ring or sleeve free to be withdrawn from the tool.

Referring to the accompanying drawings:

FIGURE 1 is a side elevation of an assembly tool in accordance with the invention.

FIGURES 3 and 4 are fragmentary sections of the tool showing the manner in which it is used.

FIGURE 5 shows the tool in use and mounted in a special vice.

FIGURES 6 and 7 are fragmentary sections illustrating further uses for the tools.

Figure 2:
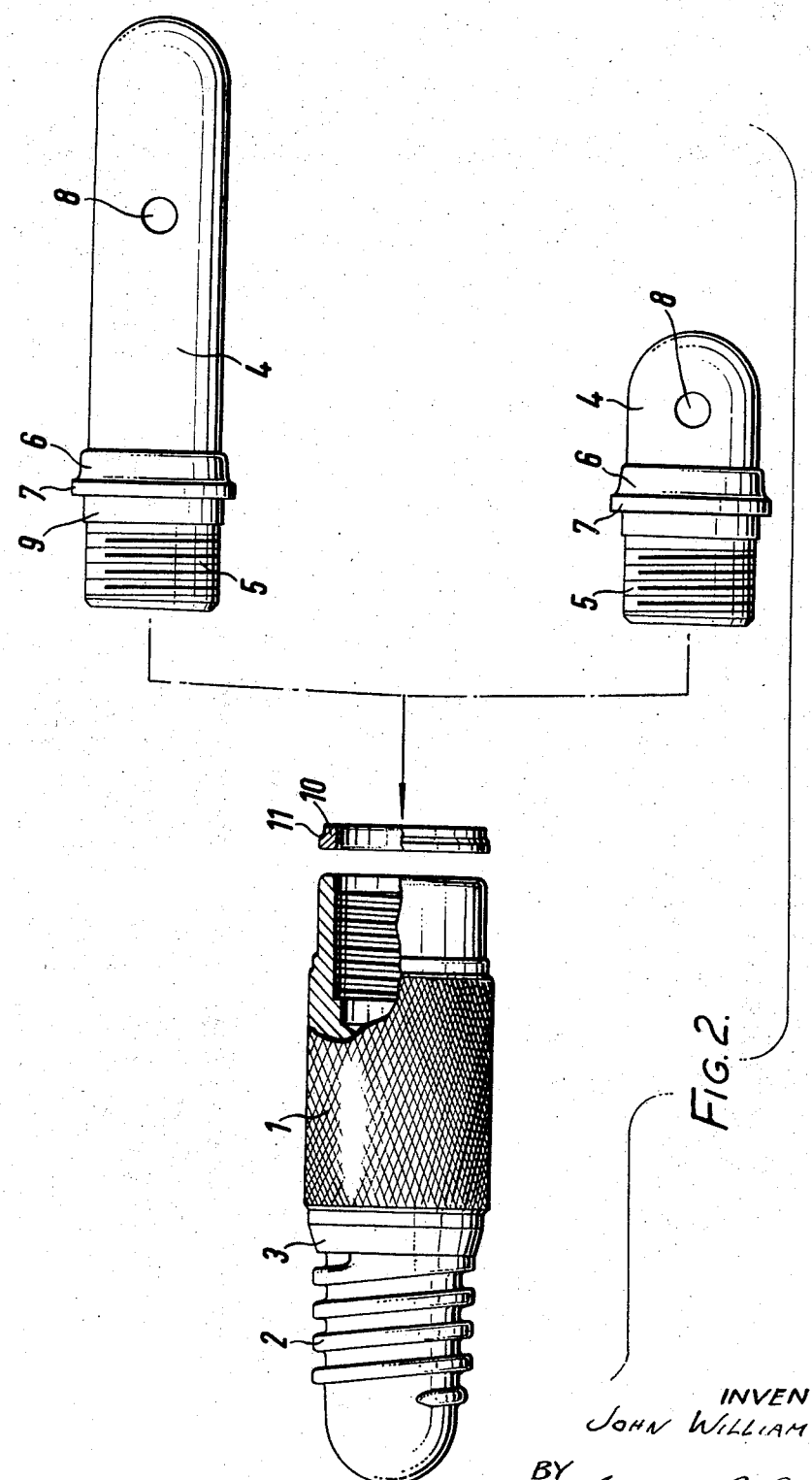
FIGURE 2 is an exploded view showing two alternative spigots for use therein.

The tool illustrated comprises a knurled cylindrical handle portion 1 having an externally threaded extension 2 leading to a frusto-conical part 3, the handle portion 1 carrying at its opposite end a cylindrical spigot 4 which has an externally threaded part 5 adapted to screw into the end of the handle portion. The spigot is formed with a shoulder having a portion 6 of slightly larger diameter than the spigot and an increased diameter part 7. The spigot may be formed with a diametrical hole 8 for the reception of a tommy-bar.

The spigot may be of any suitable length, two spigots of dissimilar lengths being shown in FIGURE 2, the shorter spigot being used with conduits having preformed bends close to their ends.

The spigot is formed with a cylindrical part 9 on which is mounted a conduit cutting ring 10 having a cutting edge 11, the cutting ring being sandwiched between the part 7 and the end of the handle 1. The cutting ring preferably includes two cylindrical portions of different diameters connected by a frusto-conical portion.

The ring or sleeve which is to be inserted in the conduit is indicated generally by reference numeral 12.

In use the threaded end 2 of the tool is screwed into the end of the conduit to expand the end initially and flatten out to a certain extent the end convolutions of the conduits 13 as in FIGURE 3.

The ring or sleeve 12 is then placed in position on the spigot 4 in the position shown in FIGURE 4, the ring or sleeve abutting against the part 7, the ring or sleeve having an external diameter such that it will slip easily into position on the spigot.

The expanded end of the conduit is then removed from the threaded end of the tool and pushed over the spigot end, over the ring or sleeve 12 and over the cutting ring 10 leaving a short length of conduit overhanging the cutting ring.

The unwanted length of conduit overhanging the cutting ring is cut off with the help of a form of vice illustrated in FIGURE 5, the vice including a fixed end plate 14 having a bearing for a lead screw 15 fitted with a handle 16, a movable end plate 17 internally threaded to receive the lead screw, the movable end plate being cut away to form a cradle-like support 18 which engages an annular groove 19 in a bush 20.

The bush has a cylindrical boring 21 and the bush is first of all threaded onto the conduit and pushed by hand as far as it will go over that part of the conduit containing the ring or sleeve.

The tool conduit and associated bush are then inserted in the vice with the threaded extremity of the tool engaging the fixed end plate.

The handle 16 is then turned to rotate the lead screw and draw the movable end plate 17 and its associated bush towards the fixed end plate 14 causing the bush to ride up that part of the conduit containing the ring or sleeve. Finally that part of the conduit surrounding the cutting ring 10 will be gripped between the cutting ring and bush causing the unwanted end of the conduit to be cut cleanly along the cutting edge 11, the unwanted end 22 being left in the boring in the bush.

The bush in addition to cutting off the unwanted end of the conduit smooths out any remaining convolutions in the conduit around the ring or sleeve.

The conduit and the contained ring or sleeve is then removed from the tool and the end of the conduit projecting beyond the ring or sleeve turned inwardly in the manner of an internal cuff and with the assistance of the domed threaded end of the tool as in FIGURE 6.

Figure 7:
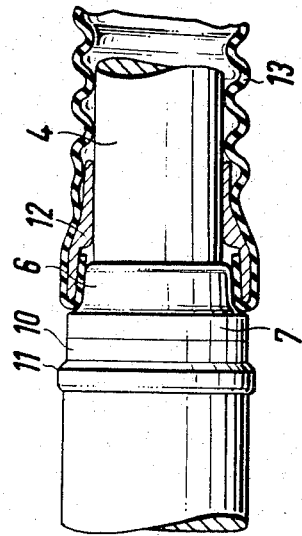

The cuff is then smoothed out by pushing the conduit and contained ring or sleeve onto the part 6 of the spigot as in FIGURE 7.

Figure 8:
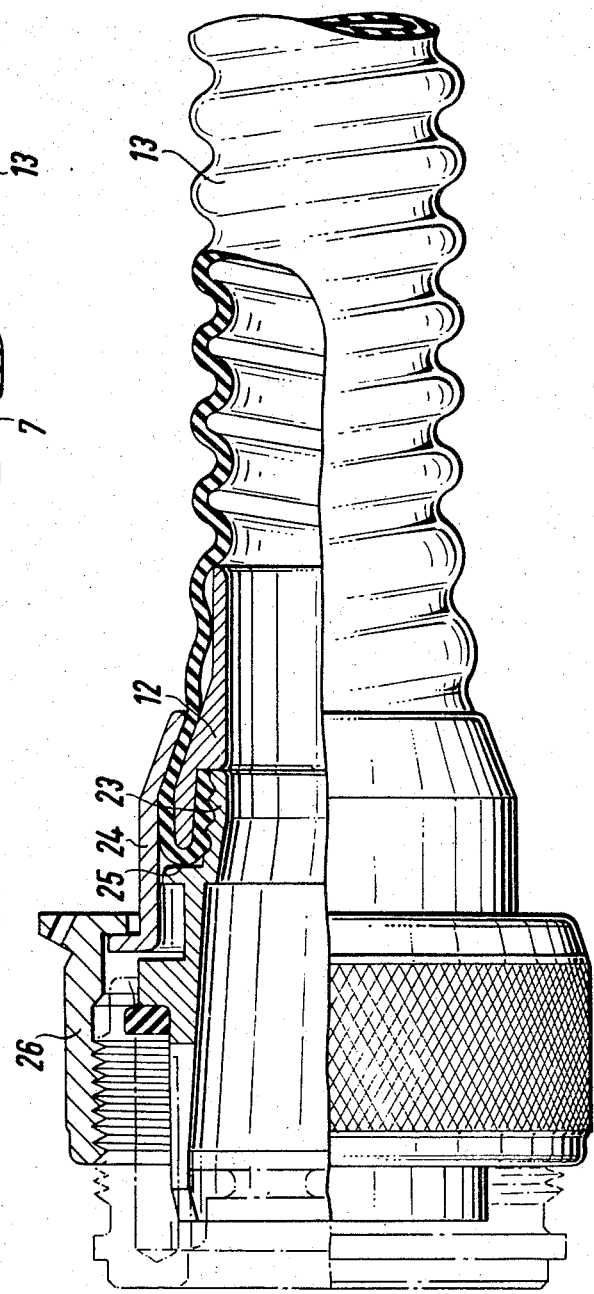
FIGURE 8 is a half section half elevation of a conduit end fitting and associated conduit.

FIGURE 8 illustrates a typical end fitting for use with a conduit having an internally arranged ring or sleeve, the end fitting including a nipple 23 and a ferrule 24 having a frusto-conical extremity, the ring or sleeve abutting against the end of the nipple, the ring or sleeve being externally tapered, the conduit being gripped between the tapered faces of the ring or sleeve 12 and the ferrule 24 and between the end of the ring or sleeve and a shoulder 25 on the nipple under the tightening action of the sleeve nut 26.

It will be appreciated that with the assistance of the tool and vice the ring or sleeve can be accurately and quickly fitted and that the cutting ring can be quickly changed for one of different diameter or width to suit the particular size of ring or sleeve which is to be used.

I claim:

1. A tool to assemble a ring on the end of a convoluted flexible conduit, said tool including a handle portion threaded at one end to screw into the end of the convoluted conduit, a frusto-conical part adjacent said threaded end for initially expanding the end of the conduit, the handle portion at its opposite end carrying a detachable cylindrical spigot, said spigot having a first shoulder to support a ring to be inserted in the conduit, said spigot also having a detachable cutting ring having a diameter greater than that of a ring to be assembled, said cutting ring having a cutting edge, said spigot and opposite end of the handle portion being inserted into such initially expanded end of a conduit so as to have such conduit project beyond said cutting ring to allow an unwanted part of the conduit to be accurately severed from the remainder.

2. A tool as claimed in claim 1 wherein the detachable spigot has a threaded extremity for entry into an internally threaded boring in the opposite end of the handle, said spigot including a cylindrical part having a diameter equal to the inside diameter of said cutting ring for supporting the cutting ring therearound, a second shoulder adjacent said cylindrical part, the cutting ring being clamped between said opposite end of the handle portion and said second shoulder.

3. A tool as claimed in claim 1, wherein said cutting edge is formed by two cylindrical portions of different diameters connected by a frusto-conical portion.

4. A tool as claimed in claim 1, including a device comprising fixed and movable end plates connected by a lead screw, the movable plate being cut away to form a cradle-like support for a bush bored to a diameter such that when surrounding the conduit and being forced up that part of the conduit surrounding the cutting ring, the end of the conduit will be smoothed out and the unwanted part severed with a shearing action along the cutting edge on the cutting ring and as a result of endwise displacement of the bush under the tightening action of the lead screw, the threaded extremity of the tool engaging the fixed end plate during the smoothing and severing operation.

References Cited

UNITED STATES PATENTS

| | | | |
|---|---|---|---|
| 1,793,454 | 2/1931 | Bergtson | 29—235 |
| 3,037,798 | 6/1962 | Cooper | 29—235 X |
| 3,180,337 | 4/1965 | Smialowski | 29—235 X |

WILLIAM FELDMAN, *Primary Examiner.*

M. S. MEHR, *Examiner.*